March 2, 1926.
M. VAN METER
VEHICLE SPRING
Filed Dec. 23, 1922
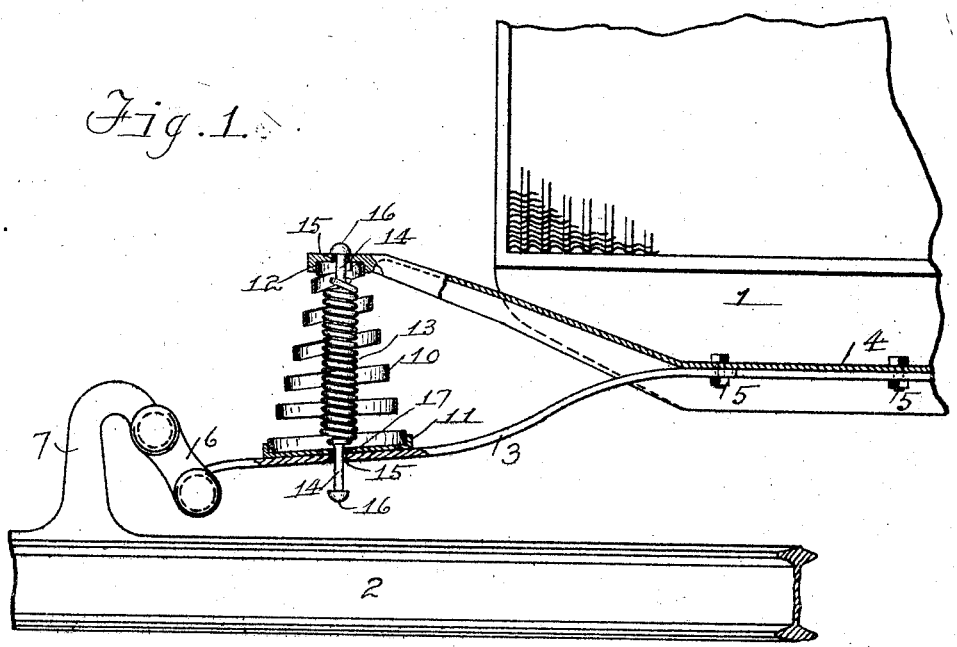
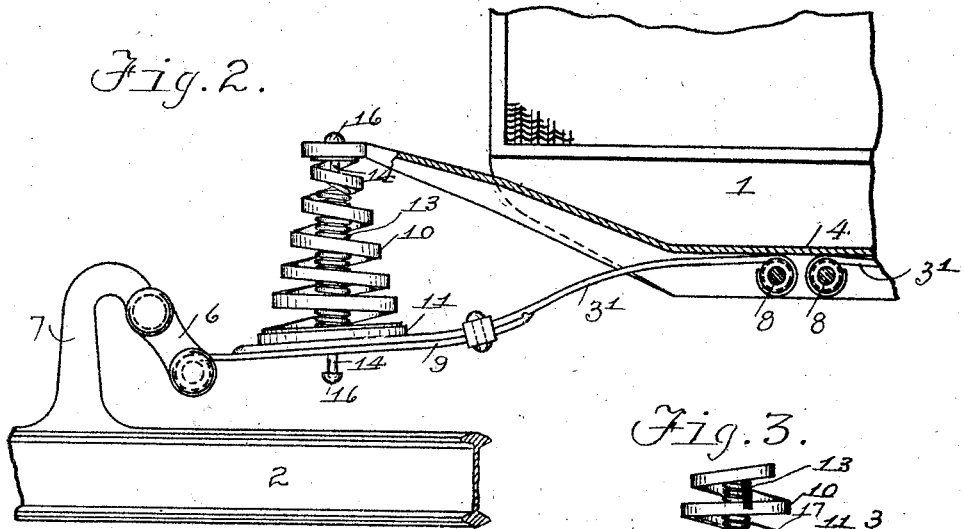
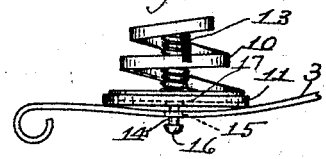
Witness:
Geo. L. Chapel
Inventor:
Marton Van Meter
by Cyrus W. Rice
Attorney.

Patented Mar. 2, 1926.

1,575,293

UNITED STATES PATENT OFFICE.

MORTON VAN METER, OF GRAND RAPIDS, MICHIGAN.

VEHICLE SPRING.

Application filed December 23, 1922. Serial No. 608,726.

*To all whom it may concern:*

Be it known that I, MORTON VAN METER, a citizen of the United States, residing at Grand Rapids, in the county of Kent and State of Michigan, have invented new and useful Improvements in Vehicle Springs, of which the following is a specification.

The present invention relates to vehicle springs; and its object is to provide for wheeled vehicles, as automobiles, an improved spring structure whereby the vehicle's body portion or chassis is supported vertically-yieldingly by its axle portion; and further, to provide improved means for cushioning the rebound of such spring structures.

This and any other objects hereinafter appearing are attained by, and the invention finds preferable embodiment in, the structure hereinafter particularly described in the body of this specification and illustrated by the accompanying drawings, in which:—

Figure 1 is a front view of a portion of the body and axle of an automobile to which my spring structure is applied, parts thereof being shown in central vertical section;

Figure 2 is a like view of a modified construction of the same; and

Figure 3 is a detail view of certain parts thereof.

In the embodiment of the invention chosen for illustration by the drawings and for detailed description in the body of this specification, my invention is shown applied to an automobile (one side thereof being seen in the drawings) having the body portion, designated generally 1, and the axle 2. An elongated connecting member 3, secured in its middle to the bolster 4 of the body 1 as by the bolts 5, and at its ends pivotally to the link 6 which is pivotally supported by the "perch" 7 of the axle, is shown in Figure 1. In this construction said member 3 is a leaf-spring yieldingly permitting the interrelative vertical movement of the body 1 and axle 2. In the modified construction however seen in Figure 2, the connecting-member is shown as comprising right-hand and left-hand portions $3^1$ each being pivotally mounted at 8 on the bolster and at its other end pivotally supported by the link 6. In th's modified construction the connecting-member $3^1$ may be a spring or may be a rigid part. In either construction shown in Figure 1 or Figure 2, the connecting-member may be stiffened, particularly adjacent the perch-connected end thereof, by a leaf 9 as shown in Figure 2 or otherwise as may be desired.

A coiled spring 10 supported by the connecting-member intermediate its connections with the body 1 and perch 6, as on the plate or cup 11 surrounding the lowest coil of such spring, supports the body 1 of the vehicle, the upper end of this spring being seated in a cup 12 in the end of the bolster 4.

It is evident that as the body 1 moves downwardly toward the axle 2, the spring 10 thus compressing or shortening, the spring-connecting member 3 in Figure 1 is flexed downwardly intermediate the connections thereof with the bolster and the link 6; or, as seen in Figure 2, the connecting-member $3^1$ (entirely or partially rigid) swings slightly on its pivotal connection 8 with the bolster. A second coiled spring 13 extending between the body's bolster 4 and the connecting-member 3 or $3^1$ is provided for resisting or cushioning the rebound of the coiled body-supporting spring 10. As shown, this spring 13 is within the spring 10 and has a shank portion 14 at its upper or lower end (or at both ends as shown) which shank portion is freely slidable in an opening 15 in the bolster or in the connecting-member, and is furnished with a retaining head 16. It is evident that during a portion of the expansive or contractive movement of the body-supporting spring 10, the rebound-cushioning spring 13 has no function, by reason of the inoperative longitudinal sliding movement of its shank 14 in the opening 15. It is also evident that when the leaf-spring 3 is sufficiently flexed downwardly, as seen in Figure 3, the absence of rigid connection between the center of the plate or cup 11 and this leaf-spring permits a freely flexing movement of the leaf-spring 3 between the edges of the plate or cup 11, the lower shank 14 of the spring 13 sliding freely in the opening 15 in the leaf-spring 3 and in a registering opening 17 in said plate or cup.

It will be seen that the connecting-member, whether of the leaf-spring resilient form 3 seen in Figure 1 or of the rigid or somewhat resilient form $3^1$ seen in Figure 2, is essentially a lever fulcrumed on the link 6, its other end being supported at 5 in Figure 1 or 8 in Figure 2 against downward movement, and supporting intermediate its ends the body-supporting spring 10; and this because this connecting-member does not, in itself alone, function as a supporting means for the body 1.

The invention being intended to be pointed out in the claims, is not to be limited to or by details of construction of the particular embodiment thereof illustrated by the drawings or hereinbefore described or shown.

I claim:—

1. In a vehicle; an axle; a body; a lever fulcrumed at one end on the axle, its other end being supported on the body against downward movement; a body-supporting coiled spring supported by the lever; rigid means carried by the body for supporting the same by the spring; a coiled spring extending between the body and the lever and yieldingly resisting the rebound of the first-mentioned coiled spring and having an inoperative movement in a portion of the first-mentioned coiled spring's operative movement.

2. In a vehicle; an axle; a body; a resilient lever fulcrumed at one end on the axle, its other end being supported on the body against downward movement; a body-supporting coiled spring supported by the lever; a coiled spring within the first-mentioned coiled spring and extending between the body and the lever and having a limited longitudinal movement relatively to at least one of them and resisting the rebound of the first-mentioned coiled spring.

3. In a vehicle; an axle; a body; a resilient lever fulcrumed at one end on the axle, its other end being supported on the body against downward movement, said lever having an opening; a plate resting on the lever and having an opening; a body-supporting coiled spring supported on the plate; a coiled spring within the first-mentioned coiled spring and extending between the body and the lever and having a shank portion extending through and freely slidable in said openings and having a head and adapted to cushion the rebound of the first-mentioned coiled spring.

4. In a vehicle; an axle; a body; a link swingably mounted on the axle; a lever fulcrumed at one end on the link, its other end being supported on the body against downward movement; a body-supporting coiled spring supported by the lever; rigid means carried by the body for supporting the same by the spring; a coiled spring extending between the body and the lever and yieldingly resisting the rebound of the first-mentioned coiled spring and having an inoperative movement in a portion of the first-mentioned coiled spring's operative movement.

In testimony whereof I have hereunto set my hand at Grand Rapids, Michigan, this 18th day of December, 1922.

MORTON VAN METER.